United States Patent
Kusey et al.

(12)
(10) Patent No.: US 6,189,260 B1
(45) Date of Patent: Feb. 20, 2001

(54) COMPRESSED MIXTURES OF COCONUT COIR PITH AND PEAT MOSS AND PROCESSES FOR THE PREPARATION THEREOF

(75) Inventors: William E. Kusey, Richwood, OH (US); Douglas George Dellmore, The Woodlands, TX (US)

(73) Assignee: OMS Investments, Inc., Wilmington, DE (US)

(*) Notice: Under 35 U.S.C. 154(b), the term of this patent shall be extended for 0 days.

(21) Appl. No.: 09/026,639

(22) Filed: Feb. 20, 1998

(51) Int. Cl.[7] ............... C09K 17/52; A01G 1/00
(52) U.S. Cl. ...................................... 47/9
(58) Field of Search ........................ 47/59, 9

(56) References Cited

U.S. PATENT DOCUMENTS

| 5,458,662 | * | 10/1995 | Toyone | 47/9 X |
| 5,839,674 | * | 11/1998 | Ellis | 241/73 |

FOREIGN PATENT DOCUMENTS

| 2028664A | * | 12/1971 | (DE) | |
| 0 041 950 B1 | * | 8/1984 | (EP) | |
| 92 08050 A1 | * | 12/1993 | (FR) | |
| 2 137 609 | * | 10/1984 | (GB) | |
| 2234612 | * | 9/1990 | (JP) | 47/59 |
| 03063316 | * | 3/1991 | (JP) | |
| 04126014A | * | 4/1992 | (JP) | |
| 406125642 | * | 5/1994 | (JP) | 47/59 |
| 406181629 | * | 7/1994 | (JP) | 47/59 |
| 407308120 | * | 11/1995 | (JP) | |
| 409221771 | * | 8/1997 | (JP) | |
| 409313049 | * | 12/1997 | (JP) | |
| 11018566A | * | 1/1999 | (JP) | |
| 11056095 | * | 3/1999 | (JP) | |
| 7508255 | * | 1/1976 | (NL) | 47/59 |
| 0904607 | * | 2/1982 | (SU) | 47/59 |
| 1029922 | * | 7/1983 | (SU) | 47/59 |
| 1053782 | * | 11/1983 | (SU) | 47/59 |
| WO 94/12576 | * | 6/1994 | (WO) | |
| WO 99/42422 | * | 8/1999 | (WO) | |

\* cited by examiner

*Primary Examiner*—Michael J. Carone
*Assistant Examiner*—Jeffrey L. Gellner
(74) *Attorney, Agent, or Firm*—Jones, Day, Reavis & Pogue

(57) ABSTRACT

Compressed mixtures of coconut coir pith and peat moss are prepared from decompressed coconut coir pith and peat moss. The compressed mixtures are capable of being decompressed to form fluffed plant growth media having improved fluffed yield and enhanced wettability characteristics.

22 Claims, No Drawings

COMPRESSED MIXTURES OF COCONUT COIR PITH AND PEAT MOSS AND PROCESSES FOR THE PREPARATION THEREOF

BACKGROUND OF THE INVENTION

1. Field of the Invention

This invent ion relates to blended compositions containing coconut coir pith and peat moss and to processes for producing such blended compositions. More particularly, it relates to coconut coir pith and peat moss blends which are compressed for sale as baled products capable of subsequent decompression to form fluffed plant growth media demonstrating improved fluffed yield characteristics and enhanced wettability as compared with the results obtained with coconut coir pith or peat moss individually.

2. Description of Related Art

Coconut coir pith is a by-product of the coconut husk fiber processing industry. Coir is the name given to the fibrous material that constitutes the thick mesocarp (middle layer) of the coconut fruit (*Cocos nucifera*). In processing, the long fibers of coir are extracted from the coconut husk for use in the manufacture of brushes, upholstery stuffing, filters, twine and like products. The short fibers (2 mm or less) and dust (collectively referred to herein as "pith") traditionally have accumulated as a waste product in large piles or "dumps" outside the mills that have processed the coconut husks for the industrially valuable long fibers. The coconut coir pith has a high lignin to cellulose content which prevents oxidation and resultant shrinkage. Accordingly, these materials do not decompose rapidly, resulting in the dumps of material which have remained as accumulated waste for extended periods of time with essentially no industrial applicability other than for burning.

Relatively recently, it has been recognized that coconut coir pith material provides an excellent growing medium for plants and it has been suggested that coconut coir pith could provide an effective alternative to previously standard growing media such as peat moss. Coconut coir pith is very similar to sphagnum peat moss in appearance having a light to dark brown color and consisting primarily of particles in the size range of 0.2–2.0 mm (75–90%). Unlike sphagnum peat, however, there are no sticks or extraneous matter in the coconut coir pith. Furthermore, sphagnum peat moss has a density of about 7 lbs/cu ft when fluffed (30–50% moisture content) whereas coir pith is much denser (i.e., about 43 lbs/cu ft when compressed at a ratio of 5:1 on volume to volume basis and about 25 lbs/cu ft when fluffed and having a 50–55% moisture content).

Additional analysis of coconut coir pith in comparison with sedge peat (also known as "Florida" peat) and sphagnum peat products has indicated that coconut coir pith has superior structural stability because of the high lignin to cellulose content of the pith which prevents oxidation and shrinkage as compared with peat moss which has a high cellulose to lignin content.

Coconut coir pith to be used as a plant growth medium is prepared by collecting aged pith from existing waste dumps or newly processed pith and drying the material to a 20% moisture content and then compressing the pith into bricks at a compression ratio of about 5:1 (v/v). These compressed bricks can then be expanded by adding water to achieve yields of about 7 volumes to each 1 volume input material at about 80% moisture content although some mechanical agitation is required in order to increase the output of the outturned coir pith. This mechanical agitation requirement presents a disadvantage in processing coir pith since it results in an inconvenience and expense for many growers and other end users of the product. A further disadvantage in the processing of coir pith as a plant growth medium is that, unlike compressed bales of peat moss which can be readily fluffed or outturned to yield a desirable fluffed product, coir pith takes considerably more time to be fluffed or "outturned".

Peat moss, including hypnum as well as sphagnum peat and sedge or "Florida" peat and the like, is a product of wetland ecosystems and is harvested in relatively large quantities to satisfy horticultural demand as a plant growth medium. Sphagnum peat is harvested by harrowing the peat from bogs and swamps, allowing the harvested product to dry and vacuum collecting it. Then, the peat moss is screened and baled. Compression ratios when baling the peat range from 1.5:1 to 2.5:1 (v/v) with an average of about 2.0:1. It is known that compression ratios below about 1.5:1 are economically unacceptable and that higher compression ratios would be commercially significant.

However, a disadvantage in the processing of peat moss for use as a plant growth medium arises as a result of the fact that compression ratios greater than about 2.5:1 cannot practically be applied to baled peat products since such ratios result in fiber destruction of the peat and consequently low fluff yields and poor product performance.

A further disadvantage in using a natural resource such as peat moss is that at the levels at which it is harvested to satisfy the substantial horticultural demand, it really cannot be considered to be renewable. Consequently, a high quality alternative to peat moss that is consistently available and also satisfies heightened environmental concerns has been recognized heretofore as being a desirable objective, and that it would be environmentally beneficial to decrease the amount of harvested peat required for horticultural use.

Another problem that has been encountered with peat moss is that when bales of this material are allowed to stand for a prolonged period of time prior to use (e.g., greater than 12 months), the peat fibers dry and become brittle resulting in reduced fluffed yield. Also, it is well known that sphagnum peat is hydrophobic and requires addition of moisture and wetting agents to cause it to take on water quickly. Coir pith, on the other hand, takes on water rapidly even at low moisture levels and without addition of any wetting agents. This rapid wetting of coir pith occurs even after wet/dry cycles; whereas when peat dries after wetting, it is quite difficult to rehydrate the product.

Another characteristic of coir pith which is distinguishable from peat moss is that coir pith is granular in nature and holds water in a matrix equivalent to a "honeycomb" or sponge, whereas peat is fibrous in nature and does not retain moisture as readily. Thus, coir pith does not shrink as much as peat moss and peat moss does not wet as well as coir pith. Furthermore, coir pith has a higher lignin/cellulose content than peat moss so that peat microbially degrades faster than coir pith, which causes weakening of the fibers and results in "shrinkage".

Thus, it was suggested that coconut coir pith could be a viable alternative to peat moss as a growing medium. However, certain problems have been recognized in regard to the economic and operational suitability of coir pith in such horticultural applications including, for example, the processing disadvantages noted above in regard to the production of coir products. It was recognized in the art that it would be advantageous to improve the usage yields, after compression and fluffing, of bags of plant growth media containing peat moss so as to conserve this natural resource.

Accordingly, products were developed which include mixtures of coir pith and peat moss. These products are now commercially available and are produced from compressed bricks of coir pith and bales of sphagnum peat moss which initially are decompressed to provide separate fluffed coir pith and fluffed peat moss raw materials. Then, the already fluffed materials are mixed together for outturning and packaging for distribution as a "loose-fill" product containing the decompressed, fluffed mixture of coir pith and peat moss. The fluffed products produced in this manner have been demonstrated to provide better media for growing plants than the media provided by coir pith or peat moss alone. It is believed that this improvement results from the peat fibers holding the coir pith granules together to provide for a more stable rooting environment. Furthermore, coir pith has been found to alleviate or reduce the disadvantageously poor wetting provided by the peat moss alone and, also, to reduce shrinkage of the peat moss. However, it has been recognized previously that these "loose-fill" products are not advantageous for purposes of shipment and/or storage of the products and that more favorable methods for producing growing media containing these mixtures would be commercially significant. It has been a source of continuing investigation to provide methods for achieving enhanced fluffed yields of blended compositions of coir pith and peat moss and for enabling the production of compressed mixtures of coir pith and peat moss which has not been possible heretofore.

SUMMARY OF THE INVENTION

Accordingly, it is a primary object of the present invention to provide blended compositions containing mixtures of coconut coir pith and peat moss as compressed products suitable for outturning and sale in baled form.

A further object is to provide baled compressed products containing mixtures of coconut coir pith and peat moss which can be readily decompressed (e.g., after shipment or storage) to supply higher than expected fluffed yields of the coir pith/peat moss mixtures for use as growing media.

Another important object of this invention is to provide a process for preparing compressed mixtures of coconut coir pith and peat moss.

The foregoing and other objects of the invention are achieved by providing blended compositions containing coconut coir pith and peat moss which are produced as compressed products ready for sale in baled form rather than as the presently available decompressed, fluffed products. In particular, we have found that by mixing decompressed coir pith and peat moss such as hypnum, sphagnum or sedge peat and subjecting the resulting decompressed mixture to a compression step, a new and improved compressed product is achieved which later can be subjected to a final decompression or fluffing step. We have found that by this procedure, the fluffed yield obtained from the coir pith/peat moss combination is significantly enhanced as compared with the anticipated average which would result from combinations of the coir pith and peat moss components. Furthermore, the fluffed yield of the peat component itself is improved when coir pith is included prior to compression as compared with peat moss compressed alone.

In a preferred embodiment of this invention, the coconut coir pith component of the mixture is initially provided in the form of compressed bricks and the peat moss is provided in the form of compressed bales. Then, the compressed coir pith and peat moss raw materials are subjected to an initial decompression step whereby separate decompressed quantities of coir pith and peat moss are produced. The resulting decompressed coir pith and peat moss materials are mixed together and compressed to produce compressed bales suitable for sale and distribution as baled products and capable of being subsequently decompressed for horticultural use.

DETAILED DESCRIPTION

We have discovered new and improved processes which enable the production of new and improved products comprising compressed mixtures of coir pith and peat moss which can be shipped or stored in compressed bales but are capable of being fluffed or "outturned" to provide decompressed mixtures of coir pith and peat moss at unexpectedly high fluff yield rates. The products of this invention are useful in a wide variety of horticultural applications and, most particularly, as soil amendments and substrates for growing plants.

Standard compressed bricks of coir pith and compressed bales of peat moss, normally, are employed as raw materials in the process of the present invention for producing compressed mixtures of coconut coir pith and peat moss; although, the process of the present invention may employ already decompressed coir pith and/or peat moss as starting materials, if such raw materials are available, and an initial decompression stage of the process may be eliminated in whole or in part.

Preferably, compressed coir pith bricks to be used in the present process have been dried to a moisture content of about 20% and have been compressed at a ratio of at least 5:1 (v/v). Compressed peat moss bales to be employed in the process may be formed from any of a variety of peat moss products such as hypnum peat, sphagnum peat, sedge peat and mixtures thereof which, preferably, have been screened prior to compression to remove oversize materials and are then compressed and baled at a ratio in a range of about 1.5:1 to about 2.5:1 (v/v).

In the process of the present invention, the compressed bricks of coir pith and the compressed bales of peat moss are subjected to an initial decompression step to provide separate decompressed or fluffed quantities of coir pith and peat moss although, as previously disclosed, at least a portion of this decompression step may be avoided by employing already decompressed coir pith and/or decompressed peat moss, if such raw materials are available. However, regardless of the source of the decompressed coir pith and/or peat moss, in the process of the present invention these decompressed raw materials are mixed together to form a blended product.

The decompressed coir pith to be mixed with the decompressed peat moss should be relatively dry and have a moisture content less than about 25% and, preferably, in a range of about 15–20%. On the other hand, the decompressed peat moss to be mixed with the decompressed coir pith should be relatively moist and have a moisture content greater than about 50%, preferably, in a range from about 50% to about 85% and, more preferably, about 70%. The amount (by volume) of coir pith to be utilized in the mixture should range from about 95% to about 5% while the peat moss should be present in an amount ranging from about 5% to about 95% although it is preferred to mix equal volumes of the coir pith and the peat moss.

After the decompressed mixture of coir pith and peat moss is prepared, the resulting mixture is compressed at a ratio ranging from about 1.5:1 (v/v) to about 2.5:1 (v/v) and, preferably, at a ratio of about 2.0–2.1:1 (v/v), in order to provide a desired compressed mixture of coir pith and peat moss suitable for shipment and sale as a baled product. Then, this compressed mixture of coir pith and peat moss may be subjected to a final decompression step in order to provide a fluffed mixture of coir pith and peat moss at a greater than anticipated fluffed yield rate and in a decreased outturn time.

The following examples are provided to illustrate preferred embodiments of the blended coir pith and peat moss products of the present invention, the preferred method of preparation and comparative evaluations with prior art compositions.

EXAMPLE 1

This Example demonstrates that fluffed yields of separate coir pith and peat moss samples decrease when the individual samples are subjected to compression followed by decompression.

Test samples of coir pith were prepared by initially decompressing standard coir pith bricks compressed at a ratio of 5:1 (v/v) using standard coir pith outturning equipment to provide fluffed materials. Then, 1 part dry, fluffed coir pith was mixed by hand in a 5 liter covered container with one equal part by volume coir pith. The container was shaken by hand until the components were thoroughly mixed. The resulting coir pith mixture was then subjected to a method of compression in which a column 6 inches tall was filled with the coir pith mixture and the material in the column was then compressed to the 3 inch mark to assure an accurate 2:1 compression ratio. Thereafter, the compressed coir pith samples were decompressed and the fluffed yield of the resulting coir pith product was measured employing the British Standard fluffed volume test.

Test samples of peat moss were prepared by initially screening Canadian sphagnum peat moss through a one-half inch screen to remove oversized material and to provide a decompressed, fluffed material which is mixed with one equal part by volume peat moss by the same procedure employed for mixing the coir pith samples. This peat moss mixture was then compressed in the same manner described above for compressing the coir pith mixture to a compression ratio of 2:1 (v/v). Then, the compressed peat moss samples were decompressed and the fluffed yield of the resulting peat moss product was measured employing the British Standard fluffed volume test.

The results of this testing which represent the mean yields of three replications each after the 2:1 compression and decompression of coir pith containing mixtures and peat moss containing mixtures are set forth in Table 1 as follows:

TABLE 1

| Coir Pith (v) | Peat Moss (v) | Moisture (%) | Fluffed Bulk Density (lbs/ft³) | Yield Before Compression | Yield After Compression |
| --- | --- | --- | --- | --- | --- |
| 1 | 0 | 20 | 8.14 | 2 | 1.88 |
| 0 | 1 | 50 | 6.61 | 2 | 1.92 |
| 0 | 1 | 60 | 7.72 | 2 | 1.92 |
| 0 | 1 | 75 | 11.6 | 2 | 1.92 |

It should be noted that the tabulated test results in Table 1 indicate that when 1 part dry, fluffed coir is mixed with one equal part coir pith and then is compressed 2:1 and then decompressed a resultant volume loss of 6% can be expected. Likewise, a 1:1 by volume mixture of peat moss that is compressed 2:1 and then decompressed will lose 4% volume.

EXAMPLE 2

This Example sets forth a comparison of weight ratios as compared to volume ratios of blends of coir pith and peat moss when equal volumes of coir pith and peat moss are mixed.

Test samples for this Example were prepared by initially decompressing standard coir pith bricks compressed at a ratio of 5:1 (v/v) using standard coir pith outturning equipment to provide fluffed coir pith materials and by milling Canadian sphagnum peat moss which was screened through a one-half inch screen to remove oversized material to provide fluffed peat moss materials. Then, equal volumes of these fluffed coir pith and peat moss materials were blended together by hand in a 5 liter covered container and the container was shaken by hand until the blended components were thoroughly mixed. The resulting decompressed mixtures of coir pith and peat moss were evaluated to determine the actual amount of coir in the mixture. That is, weight ratios are needed to determine the amount of coir pith in an equal volume mixture with peat moss since coir pith yield is determined by volume and weight. Dry coir pith yield is calculated by relating the amount of moisture (weight of water) added to a given weight of coir pith. It has been established that one metric ton of dry (15–20% moisture), 5:1 compressed coir pith will yield 22 yd³ when taken to 88% moisture. Therefore, the weight of dry, fluffed coir pith in a coir pith-peat moss mixture must be calculated to determine the actual amount of coir in the mixture.

The resultant mix percentages by weight when equal volumes of coir pith and peat moss are mixed is set forth in the following table wherein all numbers are before compression:

TABLE 2

| Coir Pith (v) | Peat Moss (v) | Coir Pith (% wt) | Peat Moss (% wt) | Coir Pith Moisture (%) | Peat Moss Moisture (%) | Coir Pith Bulk Density (lbs/ft³) | Peat Moss Bulk Density (lbs/ft³) |
| --- | --- | --- | --- | --- | --- | --- | --- |
| 1 | 1 | 60 | 40 | 20 | 35 | 8.14 | 5.4 |
| 1 | 1 | 55 | 45 | 20 | 50 | 8.14 | 6.61 |
| 1 | 1 | 51 | 49 | 20 | 60 | 8.14 | 7.72 |
| 1 | 1 | 41 | 59 | 20 | 75 | 8.14 | 11.6 |

The results tabulated in Table 2 indicate that a 50—50 by volume mixture of coir pith and peat moss is actually 55% by weight coir pith and 45% by weight peat moss. In this regard, it should be recognized that weight ratios are influenced by the bulk densities and moistures of the components of the mixture and that the bulk densities are influenced by the method of fluffing the coir pith and the method of milling the peat moss. That is, we have found that employing smaller particle size coir pith and/or peat moss in the mixture results in higher bulk densities as the materials cannot be fluffed for maximum yield.

EXAMPLE 3

In this Example, mixtures of coir pith and peat moss prepared in accordance with the teachings of Example 2 were evaluated to determine mean yields of the fluffed 1:1 (v:v) blends of coir pith and peat moss at a stage prior to compression of the mixture.

All of the mixtures were 1:1 coir pith:peat moss by volume and the yield was determined within an hour of mixing. These yield results measured immediately following mixing were as follows:

TABLE 3

| Coir Pith (v) | Peat Moss (v) | Coir Pith Moisture (%) | Peat Moss Moisture (%) | Mixtures of Coir Pith and Peat Moss Moisture (%) | Yield Before Compression |
|---|---|---|---|---|---|
| 1 | 1 | 20 | 35 | 20 | 2.01 |
| 1 | 1 | 20 | 50 | 34 | 2.12 |
| 1 | 1 | 20 | 60 | 40 | 2.22 |
| 1 | 1 | 20 | 75 | 52 | 2.30 |

As shown in Table 3, an immediate yield increase was achieved upon mixing coir pith and peat moss together. For example, one part 20% moisture coir pith added to 1 part 60% moisture peat moss yielded 2.22 parts, or an 11% yield increase.

EXAMPLE 4

Mixtures of coir pith and peat moss prepared in accordance with the teachings of Example 2 were evaluated to determine whether time influences mean yields of the fluffed 1:1 (v:v) blends of coir pith and peat moss at a stage prior to compression of the mixture. Time would only be a factor if there was a transfer of moisture from the peat moss to the dry coir pith since coir pith expands with moisture addition.

All of the mixtures were 1:1 coir pith:peat moss by volume and the yield was determined 72 hours after mixing. These yield results were as follows:

TABLE 4

| Coir Pith (v) | Peat Moss (v) | Coir Pith Moisture (%) | Peat Moss Moisture (%) | Mixtures of Coir Pith and Peat Moss Moisture (%) | Yield Before Compression |
|---|---|---|---|---|---|
| 1 | 1 | 20 | 35 | 20 | 2.02 |
| 1 | 1 | 20 | 50 | 34 | 2.13 |
| 1 | 1 | 20 | 60 | 40 | 2.27 |
| 1 | 1 | 20 | 75 | 52 | 2.37 |

The results tabulated in Table 4 shows that 72 hours after mixing, the yield has expanded an additional 5–10% for the blends containing peat moss at a 50% moisture level or greater. Measurements conducted after 72 hours indicated no additional yield expansion.

EXAMPLE 5

Fluffed 1:1 (v/v) mixtures of coir pith and peat moss prepared in accordance with the teachings of Example 2 were initially subjected to a method of compression in which a column 6 inches tall was filled with the coir pith/peat moss mixture and the material in the column was then compressed to the 3 inch mark to assure an accurate 2:1 compression ratio and the gross yield of mixed product before and after compression were recorded. Thereafter, the compressed mixtures were decompressed in order to obtain samples of fluffed coir pith/peat moss mixtures and the gross yield after the final decompression step was recorded and the net change in yield based on the 1:1 (v/v) starting mixture of coir pith and peat moss raw materials.

The mean yields of three replications of each of the samples thus prepared were as follows:

TABLE 5

| Coir Pith Moisture (%) | Peat Moss Moisture (%) | Yield Before Compression from Table 4 and Volume After 2:1 Compression | Yield After Decompression of Compressed Mixture | Net Yield Increase/Decrease |
|---|---|---|---|---|
| 20 | 35 | 2.02 (1.01) | 1.74 | −0.26 |
| 20 | 50 | 2.13 (1.07) | 1.94 | −0.06 |
| 20 | 60 | 2.27 (1.14) | 2.13 | +0.13 |
| 20 | 75 | 2.37 (1.19) | 2.26 | +0.26 |

From the tabulated results, it appears that the samples containing peat moss having a moisture content less than about 50% provided relatively disadvantageous decompressed (i.e., fluffed) net yields relative to quantity of starting material. However, it should be noted that the test samples containing peat moss moisture content greater than 50% exhibited enhanced decompressed (i.e., fluffed) net yields relative to the quantity of coir pith and peat moss starting material. For example, Table 5 indicates that the 1:1 mixture containing peat moss at 60% moisture had a net yield increase of 0.13 over the quantity of starting material.

More particularly, the tabulated results herein indicate that a peat moss moisture level of 35% resulted in a 1% yield increase (1 part coir pith+1 part peat moss=2.02) but a net loss after compression (1 part coir pith+1 part peat moss= 1.74). This is due to the fact that there is insufficient moisture to be transferred from the peat moss to the coir pith and, therefore, both materials remain brittle and attrition occurs during the stress of compression. This result is particularly significant in that this mixture contains the most coir pith by weight of all the tabulated mixtures yet results in little or no yield increase due to a lack of moisture.

Alternatively, peat moss at a moisture level of 75% resulted in an immediate yield increase ((1 part coir pith+1 part peat moss=2.30) and after 72 hours the yield increased further (1 part coir pith+1 part peat moss=2.37). This is due primarily to moisture transfer. This transfer of moisture to the coir pith causes the coir pith to expand resulting in an immediate yield increase of the blend. The data also indicates that this same mixture shows a yield increase after compression (1 part coir pith+1 part peat moss=2.26), although the yield is less than before compression.

EXAMPLE 6

A test sample was prepared by mixing 4 cubic feet of decompressed coir pith having a moisture content of 20% with 4 cubic feet of decompressed peat moss having a moisture content of 50% and compressing the resulting fluffed mixture into a 3.8 cubic foot bale. The compressed bale was then decompressed and the fluffed yield of the resulting fluffed coir pith/peat moss product was measured. The results of this testing were tabulated as follows:

TABLE 6

| Coir Pith (ft$^3$) | Peat Moss (ft$^3$) | Coir Pith Bulk Density (lbs/ft$^3$) | Peat Moss Bulk Density (lbs/ft$^3$) | Yield Before Compression (ft$^3$) | Yield After Decompression of Compressed Mixture (ft$^3$) |
| --- | --- | --- | --- | --- | --- |
| 4 | 4 | 9.9 | 6.4 | 9.5 | 9 |

The foregoing tabulated data indicates that mixing equal volumes of coir pith and peat moss results in an immediate volume increase. This yield increase is influenced primarily by the bulk densities of the materials and the moisture content of the coir pith and peat moss. The yield is influenced by bulk density in that the actual amount of coir pith in the mixture is determined by the weight of the material. The yield is affected by moisture in that a transfer of moisture from the peat causes a resultant expansion of the dry coir. Furthermore, from the tabulated data herein, it appears that a benefit in mixing occurs when, fluffed but unexpanded, coir pith at a 20% moisture level is blended with peat moss within a moisture range of 35%–99%.

EXAMPLE 7

In this example, individual samples of coir pith and peat moss were prepared in accordance with the procedure of Example 1 and a sample of a 50—50 by volume mixture of coir pith and peat moss mixture was prepared in accordance with the procedure of Example 2. These samples were then subjected to testing in order to determine porosity, air space and container capacity as well as shrinkage. The moisture of each mixture was brought up to 75% and then tested using the North Carolina State University Porometer Method.

TABLE 7

| Sample | Total Porosity | Container Capacity | % Air Space | % Shrinkage |
| --- | --- | --- | --- | --- |
| Coir Pith and Peat Moss Mixture | 82.64 | 57.25 | 25.39 | −21% |
| Peat Moss | 85.32 | 46.8 | 37.87 | −33.3% |
| Coir Pith | 91.12 | 72.94 | 18.18 | −12.5% |

The results tabulated in Table 7 indicate that the 50—50 by volume mixture of coir pith and peat moss shrinks less than the sample peat moss alone and more than coir pith alone thereby exhibiting a median shrinkage response to water addition. These results further indicate that the container capacity of peat moss is enhanced by the addition of the coir pith and the percentage air space of core pith is enhanced by the addition of peat moss.

Although the invention has been described in its preferred forms with a certain degree of particularity, it is to be understood that the present disclosure has been made by way of example only. Numerous changes in the details of the compositions and in the operational steps of the method and in the materials utilized therein will be apparent without departing from the spirit and scope of the invention, as defined in the appended claims.

We claim:

1. A composition comprising a compressed mixture of coconut coir pith and peat moss wherein the compressed mixture is prepared from decompressed coconut coir pith and decompressed peat moss and the moisture content of the peat moss is greater than about 50%.

2. The composition of claim 1 wherein said peat moss is selected from the group consisting of hypnum peat, sphagnum peat, sedge peat and mixtures thereof.

3. The composition of claim 1 wherein the moisture content of the decompressed coconut coir pith is in the range of about 15% to about 20%.

4. The composition of claim 1 wherein the moisture content of the decompressed peat moss is in a range of about 50% to about 85%.

5. The composition of claim 4 wherein the moisture content of the decompressed peat moss is 70%.

6. The composition of claim 5 wherein the coconut coir pith comprises particles in the size range of about 0.2–2.0 mm.

7. The composition of claim 1 wherein the amount (by volume) of coconut coir pith in the mixture is about 95% to about 5% and the amount (by volume) of peat moss is about 5% to about 95%.

8. The composition of claim 7 wherein equal volumes of coconut coir pith and peat moss are blended in the mixture.

9. A process for producing compressed mixtures of coconut coir pith and peat moss comprising:

providing decompressed quantities of coconut coir pith and peat moss wherein said decompressed quantities of coconut coir pith are produced by subjecting compressed bricks of coconut coir pith to an initial decompression step, mixing the decompressed coconut coir pith and peat moss; and subjecting the resulting mixture to a compression step to provide a compressed mixture of coir pith and peat moss which is structured to provided an increased yield of decompressed peat moss when the mixture is fluffed or outturned.

10. The process of claim 9 wherein the compressed coconut coir pith bricks are dried to a moisture content of about 20% and are compressed at a ratio of at least 5:1 (v/v).

11. The process of claim 9 wherein said peat moss is selected from the group consisting of hypnum peat, sphagnum peat, sedge peat and mixtures thereof.

12. The process of claim 9 wherein the decompressed coconut coir pith mixed with the peat moss has a moisture content ranging from about 15% to about 20%.

13. The process of claim 9 wherein the amount (by volume) of decompressed coconut coir pith in the mixture is in a range of about 95% to about 5% and the amount (by volume) of decompressed peat moss is in a range of about 5% to about 95%.

14. The process of claim 13 wherein equal volumes of decompressed coconut coir pith are mixed with decompressed peat moss.

15. A process for producing compressed mixtures of coconut coir pith and peat moss comprising:

providing decompressed quantities of coconut coir pith and peat moss wherein said decompressed quantities of peat moss are produced by subjecting compressed bales of peat moss to an initial decompression step;

mixing the decompressed coconut coir pith and peat moss; and subjecting the resulting mixture to a compression step to provide a compressed mixture of coir pith and peat moss which is structured to provide an increased fluffed yield of decompressed peat moss when the mixture is fluffed or outturned.

16. A process for producing compressed mixtures of coconut coir pith and peat moss comprising:

providing decompressed quantities of coconut coir pith and peat moss;

mixing the decompressed coconut coir pith and peat moss;

subjecting the resulting mixture to a compression step to provide a compressed mixture of coir pith and peat moss which is structured to provide an increased fluffed yield of decompressed peat moss when the mixture is fluffed or outturned; and subjecting the compressed mixture of coir pith and peat moss to a final decompression step in order to provide a fluffed mixture of coconut coir pith and peat moss.

17. A process for producing compressed mixtures of coconut coir pith and peat moss comprising:

providing decompressed quantities of coconut coir pith and peat moss;

mixing the decompressed coconut coir pith and peat moss; and subjecting the resulting mixture to a compression step to provide a compressed mixture of coir pith and peat moss which is structured to provide an increased fluffed yield of decompressed peat moss when the mixture is fluffed or outturned, the mixture being compressed at a ratio ranging from about 1.5:1 (v/v) to about 2.5:1 (v/v).

18. The process of claim 17 wherein the mixture is compressed at a ratio of about 2.0–2.1:1 (v/v).

19. A process for producing compressed mixtures of coconut coir pith and peat moss comprising:

providing decompressed quantities of coconut coir pith and peat moss;

mixing the decompressed coconut coir pith and peat moss, screening the peat moss to remove oversize particles prior to mixing with the coconut coir pith; and subjecting the resulting mixture of coconut coir pith and peat moss to a compression step at a ratio from about 1.5 to about 2.5:1 (v/v) to provide a compressed mixture of coir pith and peat moss which is structured to provide an increased fluffed yield of decompressed coconut coir pith and decompressed peat moss when the compressed mixture is fluffed or outturned.

20. A process for producing compressed mixtures of coconut coir pith and peat moss comprising:

providing decompressed quantities of coconut coir pith and peat moss;

mixing the decompressed coconut coir pith and peat moss, the decompressed peat moss mixed with the coir pith having a moisture content greater than about 50%; and subjecting the resulting mixture to a compression step to provide a compressed mixture of coir pith and peat moss which is structured to provide an increased fluffed yield of decompressed coconut coir pith and decompressed peat moss when the compressed mixture is fluffed or outturned.

21. The process of claim 20 wherein the decompressed peat moss mixed with the coir pith has a moisture content ranging from about 50% to about 85%.

22. A composition comprising a compressed mixture of coconut coir pith and peat moss is prepared from decompressed coconut coir pith and decompressed peat moss, the moisture content of the decompressed coconut coir pith being less than about 25% and the moisture content of the peat moss being greater than about 50%, the compressed mixture being structured to provide an increased fluffed yield of decompressed coconut coir pith and decompressed peat moss when the compressed mixture is fluffed or outturned.

* * * * *